US012260191B2

(12) United States Patent
Shi et al.

(10) Patent No.: US 12,260,191 B2
(45) Date of Patent: *Mar. 25, 2025

(54) ASSISTED COMPOSITION OF QUANTUM ALGORITHMS

(71) Applicant: Amazon Technologies, Inc., Seattle, WA (US)

(72) Inventors: Yunong Shi, Stanford, CT (US); Saravanakumar Shanmugam Sakthivadivel, White Plains, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,692

(22) Filed: Sep. 21, 2023

(65) Prior Publication Data

US 2024/0086158 A1    Mar. 14, 2024

Related U.S. Application Data

(63) Continuation of application No. 17/491,190, filed on Sep. 30, 2021, now Pat. No. 11,797,276.

(51) Int. Cl.
*G06F 8/36* (2018.01)
*G06N 10/00* (2022.01)

(52) U.S. Cl.
CPC ............ *G06F 8/36* (2013.01); *G06N 10/00* (2019.01)

(58) Field of Classification Search
None
See application file for complete search history.

(56) References Cited

U.S. PATENT DOCUMENTS 6,741,585 B1    5/2004    Munoz et al.
7,484,091 B2    1/2009    Bade et al.
(Continued)

FOREIGN PATENT DOCUMENTS

EP    1701259         9/2006
EP    2557498         2/2013
WO    2019222748 A1    11/2019

OTHER PUBLICATIONS

Haner, "A software methodology for compiling quantum programs", 2018, Quantum Sci. Technol. 3 020501 (Year: 2018).*
(Continued)

*Primary Examiner* — Hossain M Morshed
(74) *Attorney, Agent, or Firm* — Alexander A. Knapp; Kowert, Hood, Munyon, Rankin & Goetzel, P.C.

(57) ABSTRACT

A quantum programming environment may include an assisted composition system to assist the composition of quantum objects. The assisted composition system may receive a partial portion of a quantum object that is being composed but not yet fully composed by a user. The assisted composition system may determine a first abstract representation of the partial portion of the quantum object being composed. The assisted composition system may determine that the first abstract representation resembles at least a first portion of a second abstract representation of a stored quantum object stored in a library for the quantum programming environment. The assisted composition system may obtain a second portion of the stored quantum object from the library and provide it to the user as a next portion to the partial portion of the quantum object being composed.

20 Claims, 10 Drawing Sheets

(56) References Cited

U.S. PATENT DOCUMENTS

| | | |
|---|---|---|
| 7,996,836 B1 | 8/2011 | McCorkendale et al. |
| 8,032,899 B2 | 10/2011 | Archer et al. |
| 8,127,292 B1 | 2/2012 | Dobrovolskiy et al. |
| 8,201,161 B2 | 6/2012 | Challener et al. |
| 8,239,557 B2 | 8/2012 | McCune et al. |
| 8,433,802 B2 | 4/2013 | Head et al. |
| 8,514,868 B2 | 8/2013 | Hill |
| 9,230,016 B2* | 1/2016 | Neill .................. G06F 16/35 |
| 9,323,552 B1 | 4/2016 | Adogla et al. |
| 9,361,145 B1 | 6/2016 | Wilson et al. |
| 9,485,323 B1 | 11/2016 | Stickle et al. |
| 9,575,737 B1 | 2/2017 | Murray et al. |
| 9,979,694 B2 | 5/2018 | Brandwine et al. |
| 10,095,537 B1 | 10/2018 | Neogy et al. |
| 10,482,413 B2 | 11/2019 | Paterra et al. |
| 10,498,611 B1 | 12/2019 | Kloberdans et al. |
| 10,592,216 B1* | 3/2020 | Richardson ......... G06F 11/3452 |
| 10,713,582 B2 | 7/2020 | Dadashikelayeh |
| 10,719,903 B2 | 7/2020 | Artico et al. |
| 10,990,467 B2 | 4/2021 | Parthasarathy et al. |
| 11,010,145 B1 | 5/2021 | Smith |
| 11,222,279 B2 | 1/2022 | Gambetta |
| 11,442,702 B2* | 9/2022 | Smith .................. G06F 40/284 |
| 11,658,948 B2 | 5/2023 | Benson |
| 11,797,276 B1 | 10/2023 | Shi et al. |
| 11,977,957 B2 | 5/2024 | Sakthivadivel et al. |
| 2005/0013280 A1 | 1/2005 | Buddhikot et al. |
| 2005/0251806 A1 | 11/2005 | Auslander et al. |
| 2008/0244553 A1 | 10/2008 | Cromer et al. |
| 2010/0070970 A1 | 3/2010 | Hu et al. |
| 2011/0075667 A1 | 3/2011 | Li et al. |
| 2011/0131443 A1 | 6/2011 | Laor et al. |
| 2014/0208413 A1 | 7/2014 | Grobman et al. |
| 2015/0160884 A1 | 6/2015 | Scales et al. |
| 2016/0026573 A1 | 1/2016 | Jacobs et al. |
| 2016/0077845 A1 | 3/2016 | Earl et al. |
| 2016/0170781 A1 | 6/2016 | Liguori et al. |
| 2016/0170785 A1 | 6/2016 | Liguori et al. |
| 2017/0300354 A1 | 10/2017 | Dalal et al. |
| 2017/0366606 A1 | 12/2017 | Ben-Shaul et al. |
| 2018/0260125 A1 | 9/2018 | Botes et al. |
| 2019/0197653 A1 | 6/2019 | Artico et al. |
| 2020/0117469 A1* | 4/2020 | Siegwart .................. G06F 8/53 |
| 2020/0394027 A1* | 12/2020 | Ducore ................ G06N 10/80 |
| 2021/0012233 A1 | 1/2021 | Gambetta |
| 2021/0019125 A1* | 1/2021 | Shi ............................ G06N 5/04 |
| 2021/0034334 A1 | 2/2021 | Massad |
| 2021/0166133 A1 | 6/2021 | Ronagh |
| 2021/0286601 A1 | 9/2021 | Fitzsimons |
| 2021/0303279 A1* | 9/2021 | Bird ........................ G06F 8/751 |
| 2022/0084085 A1 | 3/2022 | Rigetti |
| 2022/0215279 A1 | 7/2022 | Rahman |
| 2022/0358390 A1 | 11/2022 | Ruedinger |
| 2022/0382586 A1 | 12/2022 | Bernat et al. |
| 2023/0020389 A1 | 1/2023 | Davis |
| 2023/0040849 A1 | 2/2023 | Sakthivadivel et al. |
| 2023/0259802 A1 | 8/2023 | Klimov |

OTHER PUBLICATIONS

Klappenecker, "Quantum Software Reusability", 2003, arXiv, (Year: 2003).*

Igor L. Markov, et al., "Quantum Supremacy is Both Closer and Farther than It Appears", arXiv:1807.10749v3, Sep. 26, 2048. pp. 1-32.

U.S. Appl. No. 16/196,723, filed Nov. 20, 2018, Anthony Nicholas Liguori, et al.

Ozgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-2/13/04, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.

Robbert van Renesse, et al, "Chain Replication for Supporting High Throughput and Availability, USENIX Association, OSDI 2004: 6th Symposium on Operating Systems Design and Implementation," pp. 91-104.

Philip A. Bernstein, et al, "Concurrency Control and Recovery in Database Systems," Addison-Wesley Publication Company, ISBN 0-201-10715-5, 1987, pp. 1-58.

From Wikipedia, the free encyclopedia, "Bromium," downloaded on Jun. 27, 2016 from https://en.wikipedia.org/wiki/Bromium, pp. 1-4.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

Udo Steinberg, et al., "NOVA: A Microhypervisor-Based Secure Virtualization Architecture", ACM, EuroSys'10, Apr. 13-16, 2010, pp. 209-222.

Sangster, et al., TCG Published, Virtualized Trusted Platform Architecture Specification, Specification Version 1.0, Revision 0.26, Sep. 27, 2011, pp. 1-60.

Network Functions Virtualisation (NFV); NFV Security; Security and Trust Guidance, ETSI GS NFV-SEC 003, V1.1.2, downloaded by EP on Jun. 4, 2016, pp. 1-57.

Cong Xu, et al., "vSlicer: Latency-Aware Virtual Machine Scheduling via Differentiated-Frequency CPU Slicing", Purdue University, Purdue e-Pubs, 2012, pp. 1-14.

Amazon Web Services, "Amazon Elastic Compute Cloud: User Guide for Linux Instances," Latest Version update 2018, pp. 1-884.

Amazon Web Services, "Amazon Elastic Container Service: Developer Guide" API Version, Nov. 13, 2014, pp. 1-386.

Amazon Web Services, "AWS Lambda: Developer Guide" 2018, pp. 1-539.

AWS, "Annoucing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.

Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.

Jeff Barry, Aazon Braket-Get Started with Quantum Computer, AWS News Blog, Retrieved from https://aws.amazon.com/blogs/aws/amazon-braket-get-started-with-quantum-computing/ on Jul. 30, 2021, pp. 1-7.

Peter Karaleka, et al., "Fast Hybrid Programming with Quantum Cloud Services," Retrieved from https://medium.com/rigetti/fast-hybrid-programming-with-quantum-cloud-services-7573f48b93b5 on Jul. 30, 2021, pp. 1-8.

Roberts, "Partial-Match Retrieval via the Method of Superimposed Codes," 1979, IEEE.

Klappenecker, "Quantum Software Reusability," 2003, arXiv.

International Search Report and Written Opinion mailed Mar. 19, 2021 in PCT/US2020/062176, Amazon Technologies, Inc., pages.

Alexey Svyatkovskiy, et al., "IntelliCode Compose: Code Generation using Transformer," ACM, found at arXiv:2005.08025v2 [cs.CL], pp. 1-11.

(56) References Cited

OTHER PUBLICATIONS

Seth Copen Goldstein, et al: "Linking", Carnegie Mellon, Feb. 21, 2013, pp. 1-53, Retrieved from the Internet: URL:https://www.cs.cmu.edu/afs/cs/academic/class/15213-sl3/www/lectures/12-linking.pdf [retrieved on Aug. 8, 2023].

Haner, "A Softwarae methodology for compiling quantum programs," 2018, Quantum Sci, Technol. 3 020501.

U.S. Appl. No. 16/698,737, filed Nov. 27, 2019, Christopher Kasprowicz.

U.S. Appl. No. 17/491,190, filed Sep. 30, 2021, Yunong Shi et al.

U.S. Appl. No. 16/698,674, filed Nov. 27, 2019, Jeffrey Paul Heckey, et al.

U.S. Appl. No. 16/698,698, filed Nov. 27, 2019, Derek Bolt, et al.

U.S. Appl. No. 16/698,732, filed Nov. 27, 2019, Jeffrey Paul Heckey, et al.

Yijun Yu, et al. "Reducing Build Time Through Precompilations for Evolving Large Software," Proceedings of the 21st IEEE International Conference on Software Maintenance (ICSM'05), Sep. 26, 2025, pp. 59-68, IEEE.

U.S. Appl. No. 18/628,331, filed Apr. 5, 2024, Sakthivadivel, et al.

\* cited by examiner

ASSISTED COMPOSITION OF QUANTUM ALGORITHMS

PRIORITY APPLICATION

This application is a continuation of U.S. patent application Ser. No. 17/491,190, filed Sep. 30, 2021, which is hereby incorporated by reference herein in its entirety.

BACKGROUND

A service provider network may allow clients to access services, via network connections, that are implemented using resources at locations remote from the clients. Such services may be said to reside "in the cloud."

Quantum computers utilize the laws of quantum physics to process information. Compared to classical (binary) computers, quantum computers work with quantum bits (or qubits). Qubits can experience the phenomena of "superposition" and "entanglement." Superposition allows a qubit to be in multiple states at the same time. For example, whereas a classical computer is based on bits that are either zero or one, a qubit may be both zero and one at the same time, with different probabilities assigned to zero and one. Entanglement is a strong correlation between qubits, such that the qubits are inextricably linked in unison even if separated by great distances. By using superposition and entanglement, quantum computers have the potential to process information in new ways to solve computational problems that are beyond the reach of classical computers.

Figure 1:
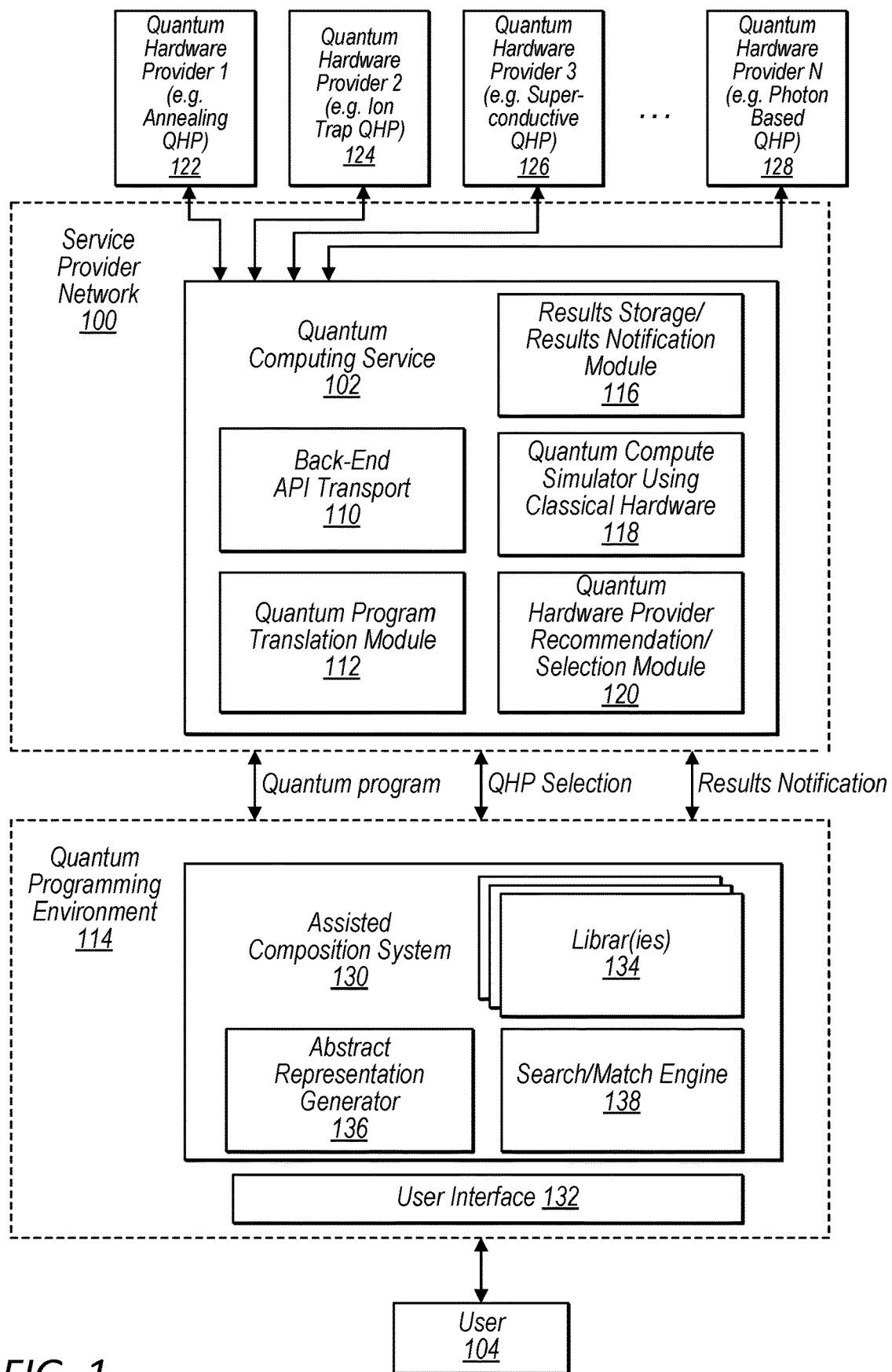
FIG. 1 shows an example quantum programming environment that may include an assisted composition system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

A quantum program is a computing program including instructions that may be compiled to be executed on a quantum computer. Generally, a quantum program is used to perform one or more quantum algorithms. In some embodiments, a quantum program may implement a single quantum circuit or multiple quantum circuits. For example, in some embodiments, a quantum program may include logical loops that instruct a particular quantum circuit to be implemented based on one or more conditions, such as a "for loop", "if loop", "while loop", etc. In addition, in some embodiments, a quantum program may instruct implementation of a parametric quantum circuit where the angles of one or more quantum gates are not determined. In some embodiments, a quantum circuit may include data qubits storing logical quantum data and quantum gates that perform logical operations using the logical quantum data as inputs and generating logical quantum data outputs that are stored in data qubits. For example, some example gates that may be included in a quantum circuit include Pauli-X, Pauli-Y, and Pauli-Z gates, Hadamard gates, phase gates, T gates, controlled gates (e.g., CNOT, CZ, CX), swap gates, Toffoli gates (CCNOT, CCX, TOFF, etc.) and other various gates. In some embodiments, a particular programmer may generate their own unique gates and/or different types of gates may be customized to the capabilities of particular types of quantum computers or devices. For example, quantum computers may be implemented based on different quantum computing technologies or types of quantum hardware. For example, some quantum computers may use qubits built from superconductors, trapped ions, semiconductors, photonics, etc. Thus, for a given quantum program, different quantum computers may use different types of quantum gates to execute the quantum program to perform the instructed algorithm(s).

Some quantum programs may be written using a high-level quantum programming language to achieve readability. For example, a quantum program may be composed using text-based quantum programming languages, such as Quil, OpenQASM, cQASM, etc. Such quantum programs may be relatively easy to read and understand, similar to how a classical computing program is written in a high-level classical programming language, such as C or Java. However, given the different types of quantum hardware that may be used to implement a quantum program, a high-level quantum program may need to be first translated into appropriate quantum gates that are native to and specific to a given type of quantum computer, and then further compiled into an executable file for executing using the given type of quantum computer. The translated file of the native quantum gates may be referred to as a low-level quantum circuit or a low-level quantum program. Also, as further discussed below, in some embodiments, quantum circuits and/or quantum programs may be written in one or more intermediate levels of abstraction that include more or fewer hardware specific elements, such as native gates, etc.

Sometimes, if a user has the knowledge of the native quantum gates of a quantum computer, the user may compose a quantum program or quantum circuit directly using the low-level native quantum gates of the quantum computer. Sometimes, a user may implement quantum programs and/or quantum circuits using a mid-level quantum programming language. A mid-level quantum program language may be written using non-hardware specific gates, instead of native quantum gates. However, a mid-level quantum program may also need to be translated into a low-level quantum circuit before it may be compiled and executed on a quantum computer. In some embodiments, a quantum circuit or quantum program comprising quantum circuit may be represented in various manners, such as via text or may be represented in a quantum circuit diagram. In short, a quantum program or quantum circuit may be represented in a text-based quantum programming language (e.g., Quil, OpenQASM, cQASM, etc.) or a quantum circuit diagram. Further, if a quantum program or quantum circuit is not written using native quantum gates, the gates of the quantum circuit may need to be converted to native quantum gates before compilation and execution on a quantum computer. Given these characteristics of quantum programs and quantum circuits, unlike a classical computing program, a quantum program and/or quantum circuit may be un-intuitive and hard to compose. e.g., the quantum program and/or quantum circuit may be hard to read and thus prone to programming errors, especially if the quantum program is not composed using a generic high-level quantum programming language. Thus, it may be desirable to have tools to assist users to compose quantum programs.

Various embodiments described herein relate to techniques for implementing assisted composition of quantum algorithms. For purposes of illustration, in this disclosure, a quantum algorithm represented in a text-based quantum program, a gate-based quantum circuit diagram, or a combination of both may be also collectively referred to as a quantum object. In some embodiments, the assisted composition techniques may be implemented as part of a quantum programming environment. In some embodiments, a quantum programming environment may be provided to a user through a software development kit (SDK). For example, when a user installs the SDK at the user's local machine, the SDK may provide a quantum programming environment that includes a user interface, such as an interactive graphic interface, through which the user may compose high-level, mid-level, and/or low-level quantum circuits or quantum programs. In some embodiments, the SDK may include one or more software components, which may operate within the quantum programming environment to provide assisted composition of quantum circuits or quantum programs.

In some embodiments, the quantum programming environment may be considered as an "extension" of a network-accessible cloud-based quantum computing service of a service provider network. Through the quantum programming environment, users may conveniently access the quantum computing service. For example, when a user completes the composition of a quantum circuit or quantum program in the quantum programming environment, the user may use tools (e.g., buttons, dialog windows, etc.) provided by the quantum programming environment to conveniently submit the quantum circuit or the quantum program to the quantum computing service for translation, compilation and/or execution. Further, the quantum computing service may provide users access to one or more quantum hardware providers, where quantum circuits or quantum programs composed by users may be executed using various quantum computers or quantum hardware, e.g., quantum annealers, trapped ion quantum computer, superconducting quantum computers, photonic devices.

To implement the assisted composition, in some embodiments, the quantum programming environment may include an assisted composition system. In some embodiments, the assisted composition system may include one or more libraries, an abstract representation generator, and a search/match engine. In some embodiments, a library of the assisted composition system may store one or more quantum circuits or quantum programs such as their source codes and/or source circuit diagrams, and one or more abstract representations respectively of the one or more quantum circuits or quantum programs. In some embodiments, a quantum programming environment may enable users to compose a quantum circuit or quantum program using multiple quantum programming languages or graphic tools, such as high-level, mid-level, and/or low-level quantum programming languages and/or graphic tools that provide generic and/or native quantum gates. In such embodiments, an assisted composition system may store more than one library. For example, the assisted composition system may store a separate library for each supported quantum programming language. Also, in some embodiments, inputs received from a user may be translated such that at least some libraries are used to support multiple quantum programming languages.

In some embodiments, the quantum circuits or quantum programs stored in a library may be quantum circuits or quantum programs that are frequently used by users. In some embodiments, an assisted composition service may augment the contents of a library based on user submitted quantum circuits or quantum programs. For example, when a user submits a quantum circuit or quantum program, an abstract representation of the quantum circuit or quantum program may be added to a library for future use in providing assisted composition support. In some embodiments, an assisted composition system may maintain different libraries for different users, such that quantum circuits or quantum programs submitted by a particular user are added to the library for that user, but are not necessarily added to libraries available for use in assisted composition services for other users. In some embodiments, a user may opt-into sharing their quantum circuits or quantum programs with other users, and may thus allow for adding of such quantum circuits or quantum programs to one or more libraries available for use in performing assisted composition services for other users. In some embodiments, such users may be rewarded for sharing their quantum circuits or programs, such as via monetary compensation, credits, access to enhanced services or features, etc. In some embodiments, a suggestion for an auto completed quantum circuit or portion thereof, may be provided to a user via an assisted composition system and may further indicate if the suggested quantum circuit or program is being provided from a pool of quantum circuits and quantum programs included in the library by the assisted composition service, or whether the suggested quantum circuit or quantum program is one that was submitted by another user of the quantum computing service. Moreover, in some such embodiments, the suggestion may indicate if the suggested quantum circuit or quantum program can be used free of charge, or if a licensing fee is required for use of the suggested quantum circuit or quantum program.

In some embodiments, a library may be implemented using various appropriate database technologies. For example, a library may be implemented as a relational database to store one or more records, where the records may individually include a name (or ID) of a stored quantum program or quantum circuit, a source code and/or source circuit diagram of the stored quantum program or quantum circuit, and an abstract representation of the stored quantum program or quantum circuit. In some embodiments, other storage structures, such as a non-relational database may be used. In some embodiments, the abstract representation of a quantum program or quantum circuit may be a tree representation, such as an abstract syntax tree of the quantum program or quantum circuit. In some embodiments, the abstract representation of a quantum program or quantum circuit may be created during a parse and analysis process of the quantum program or quantum circuit.

In some embodiments, the quantum computing service may identify and/or create one or more quantum programs or quantum circuits on its own as commonly-used quantum programs or commonly-used quantum circuits. The quantum computing service may generate abstract representations of these quantum circuits and/or quantum programs, and store the quantum circuits and/or quantum programs (e.g., their source codes and/or source circuit diagrams) and associated abstract representations in a library of the assisted composition system. For purposes of illustration, this type of quantum programs/quantum circuits may be referred to as general quantum programs/circuits. In some embodiments, the quantum computing service may receive quantum programs/circuits composed and submitted from users of the quantum computing service. For at least some of these quantum programs or quantum circuits, the quantum computing service may generate abstract representations, and store the quantum programs/circuits and associated abstract representations in one or more libraries, if authorized by the user(s) submitting the quantum programs or quantum circuits. For purposes of illustration, this type of quantum programs/circuits may be referred to as user-defined quantum programs/circuits. In some embodiments, the quantum programming environment may store records for completed quantum programs/circuits that are ready to be submitted for translation, compiling, and execution. In other words, in some embodiments, such completed quantum programs and their associated abstract representations may be stored in the library.

In some embodiments, the assisted composition system may use user-defined quantum programs or user-defined quantum circuits on a per-user basis. For example, the stored user-defined quantum programs composed by user A may only be used to assist the composition of a quantum program being composed by user A, and not a different user. In some embodiments, the user-defined quantum programs may be used across different users to assist the composition of quantum programs. For example, the assisted composition system may use stored user-defined quantum programs composed by user A to assist the composition of quantum programs by user B. In some embodiments, user B may be required to obtain a permission or authorization for accessing the stored user-defined quantum programs composed by user A. Further, in some embodiments, the permission or authorization may be fee-based. For example, user B may pay a fee for acquiring the permission or authorization. In some embodiments, the fee may be collected by the quantum computing service on behalf of user A.

In some embodiments, when a user attempts to compose a quantum program or quantum circuit, before the user completes the quantum program or quantum circuit, the quantum programming environment may receive only a partial portion of the quantum program or quantum circuit (e.g., only an uncompleted quantum program/circuit). The abstract representation generator of the assisted composition system may obtain the partial portion of the quantum program/circuit, and generate an abstract representation of the partial portion. Based on the generated abstract representation of the partial portion of the quantum program or quantum circuit that is being composed but not completed by the user, the search/match engine of the assisted composition system may search a library to determine whether the generated abstract representation resembles at least a portion of an abstract representation of a quantum program or quantum circuit stored in the library. When the search/match engine identifies a stored quantum program/quantum circuit based on the resemblance of the abstract representations, the search/match engine may further identify a portion (e.g., a portion of the source code and/or source circuit diagram) of the stored quantum program/quantum circuit, and provide it to the user as a recommended next portion to the partial portion of the quantum program or quantum circuit being composed by the user. When the user decides to use the recommended portion, the user may provide an indication to the assisted composition system to accept the suggestion. In response, the search/match engine may obtain the recommended portion from the library, and add it to the uncompleted quantum program or quantum circuit as the next portion. In some embodiments, the resemblance of the abstract representations may be determined when one abstract representation matches or is the same as at least one portion or part of another abstract representation.

In some embodiments, because the search/match engine operates based on a partial portion of a quantum program or quantum circuit, the search/match engine may not necessarily perfectly predict the quantum program that the user attempts to compose. For example, in some embodiments, there may be multiple stored quantum circuits or quantum programs that include portions matching the partial portion that has already been composed by the user. As a result, the search/match engine may find multiple matched records in the library. When too many records are recommended to a user, the recommendation may become less helpful. Thus, to improve the accuracy and quality of the recommendation, in some embodiments, the search/match engine may utilize a threshold to refine the matched records to be presented to a user. In some embodiments, the threshold may indicate an allowable maximum number of records to be recommended to a user. For example, when the threshold is two, the assisted composition system may not provide a recommendation when it finds more than two matched records in the library. In other words, the assisted composition system may consider that such search/match results are too vague (and thus there are too many matched records). One reason for this may be because the partial portion of the uncompleted quantum program is not sufficiently defined to provide enough information about the quantum program/quantum circuit that the user attempts to compose. As a result, the assisted composition system may not precisely differentiate the desired quantum program/quantum circuit from other similar quantum programs/quantum circuits. Thus, the assisted composition system may wait for the user to continuously compose the quantum program, until it reaches a point where the search/match engine may find only two or less matched records in the library, and then provide a recommendation to the user. For example, if the threshold is two, the assisted composition system may refrain from providing a suggestion to the user until the quantum program/quantum circuit being composed by the user is sufficiently defined such that two or fewer records in the library are matched. However, it is noted that in some embodiments, an assisted composition system may perform such an analysis on a per-line, per set of lines, or whole quantum program/quantum circuit basis. Thus, even if more than a threshold number of matches are stored in the library for a whole quantum circuit or whole quantum program, they may all share a same next line or set of lines, such that a more limited suggestion, limited to the next line or set of lines, satisfies the threshold and may therefore be provided to the user. In some embodiments, the threshold may be configured to a default value by the quantum programming environment or quantum computing service. In some embodiments, the threshold may be configurable by users of the quantum programming environment or quantum computing service.

In some embodiments, the assisted composition system may also be able to detect programming errors in quantum programs or quantum circuits composed by users. For example, based on the search and match results, the assisted composition system may provide an indication that a partial portion of the quantum program or quantum circuit already composed by the user includes an error. This may be done via a similar method as described above. For example, an abstract representation may be used to identify a matching line, set of lines, or whole quantum circuit or quantum program. However, some variations may be allowed in the matching (such as for erroneous entries provided by the user). The assisted composition service may then provide suggestions for correcting the quantum circuit or quantum program being composed by the user. For example, differences between the already composed portions and the matching portions may be presented as possible errors. In some embodiments, additional methods may be used to identify errors, such as enforcing syntax rules by flagging entries in the already composed portions that violate syntax rules etc. In addition, in some embodiments, the assisted composition system may be able to determine what quantum computers or quantum hardware may execute quantum programs from users, and provide an indication recommending the quantum hardware providers for executing the quantum programs. For example, particular gate types may be better implemented on certain types of quantum hardware devices. Thus, the assisted composition system may identify such gate types and make a recommendation based on this information, as to what type of quantum hardware device the quantum program or quantum circuit being composed may be implemented on.

FIG. 1 shows an example quantum programming environment that may include an assisted composition system, according to some embodiments. In FIG. 1, in some embodiments, quantum programming environment 114 may be operatively coupled with network-accessible quantum computing service 102 of service provider network 100, e.g., through one or more network connections. In some embodiments, quantum computing environment 114 may be considered an "extension" of quantum computing service 102, because quantum computing environment 114 may provide user 104 convenient access to quantum computing service 102. For example, user 104 may use user interface 132 of quantum programming environment 114 to compose a quantum program. When user 104 completes the quantum program, user 104 may use tools (e.g., buttons, dialog windows, etc.) of user interface 132 to conveniently submit the quantum program to the quantum computing service for translation, compilation, and execution. Further, quantum computing service 102 may provide user 104 access to one or more quantum hardware providers 122, 124, 126 and 128, where quantum programs from user 104 may be executed using various quantum computers or quantum hardware, e.g., quantum annealers, trapped ion quantum computer, superconducting quantum computers, photonic devices.

Figure 4:
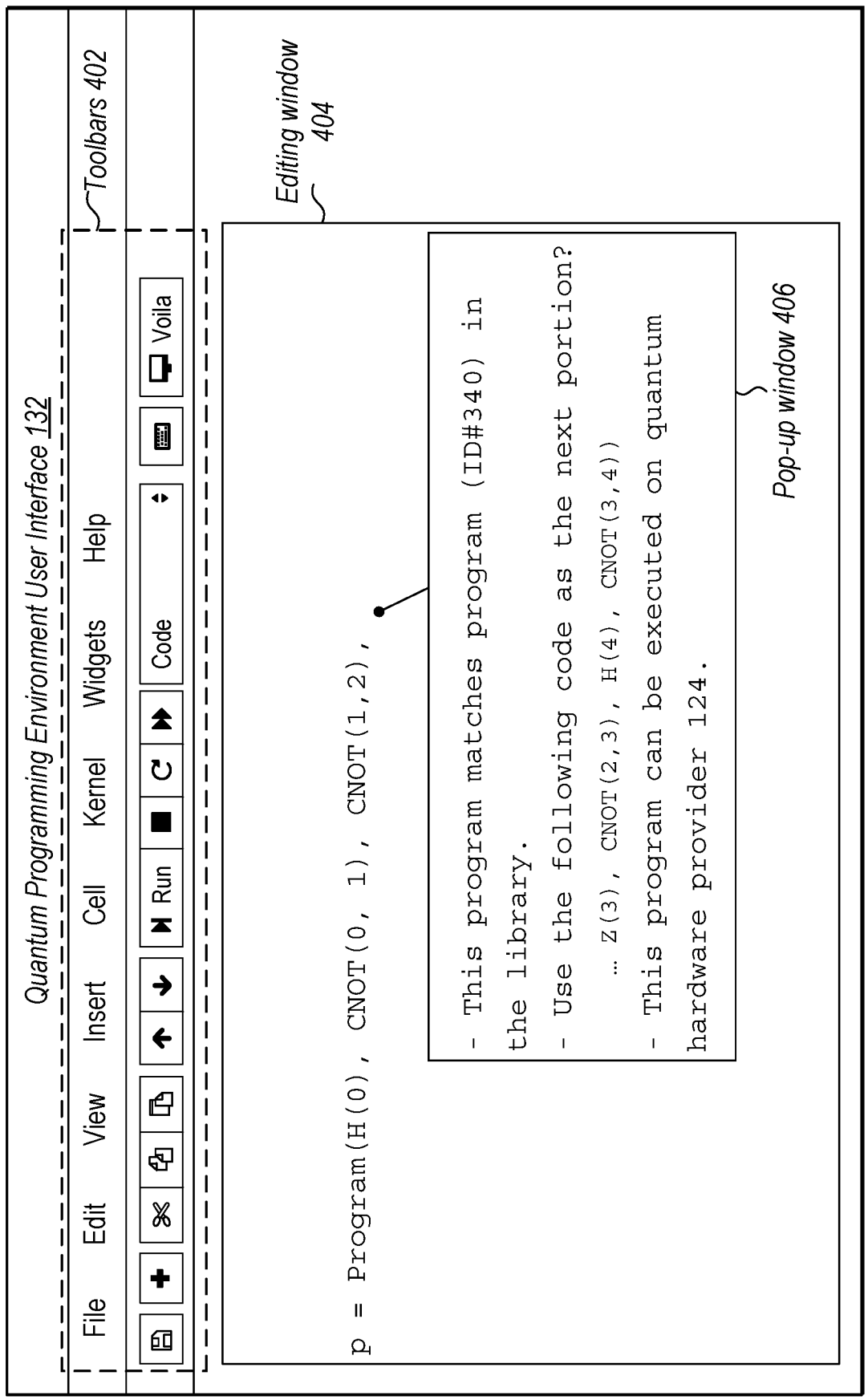
FIG. 4 shows an example user interface of the quantum programming environment, according to some embodiments.
Figure 5:
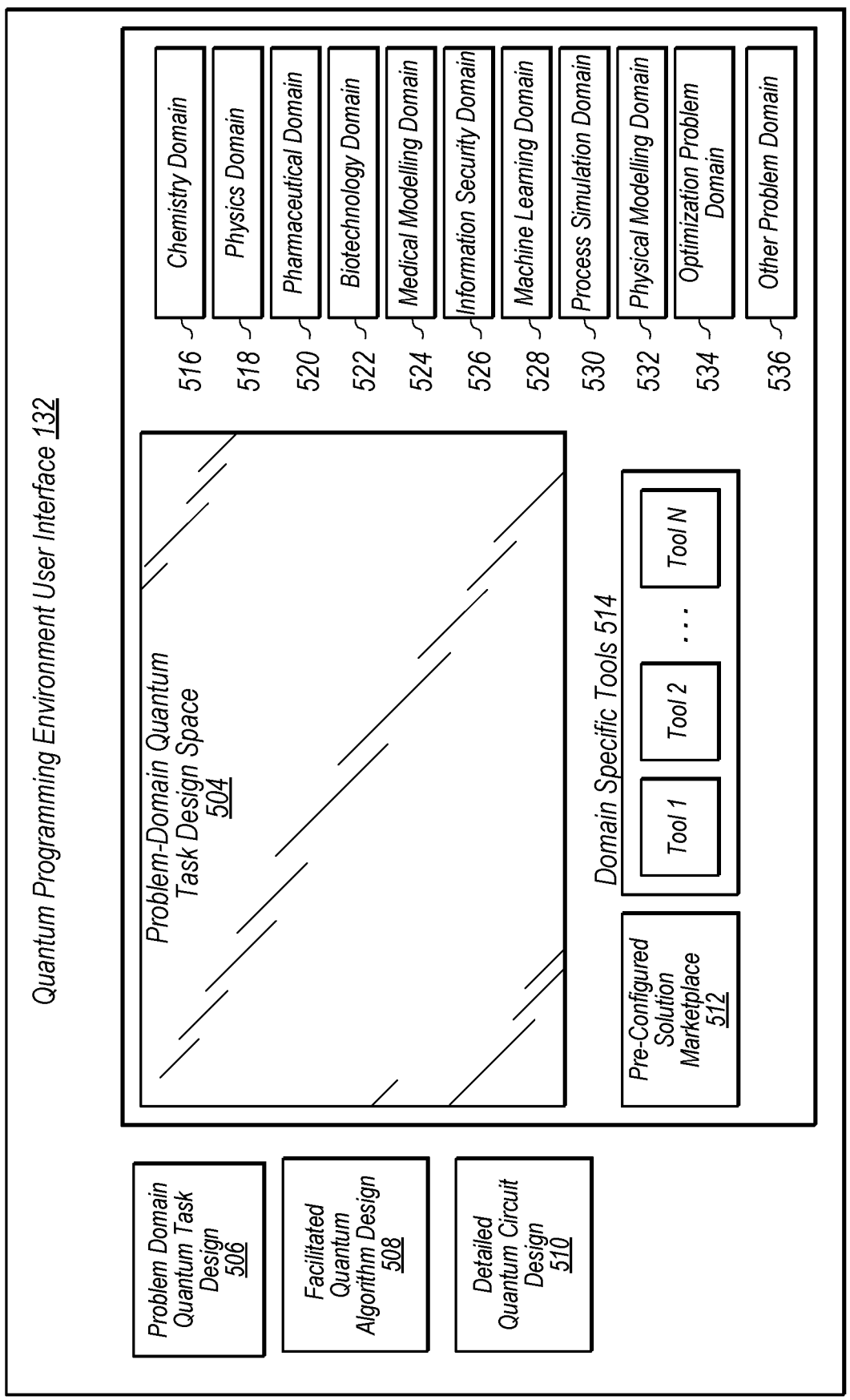
FIG. 5 shows another example user interface of the quantum programming environment, according to some embodiments.

In some embodiments, quantum programming environment 114 may be provided to user 104 in various ways. For example, in some embodiments, user 104 may install a quantum programming SDK (software development kit) at the user's local machine to obtain access to quantum programming environment 114. For example, FIG. 5 illustrates an example SDK and FIG. 4 illustrates an example dialog box for composing a quantum circuit and/or quantum program, which may be provided by an SDK, such as the SDK shown in FIG. 5. In some embodiments, quantum programming environment 114 may run on the user's local machine. Alternatively, in some embodiments, at least a portion of quantum programming environment 114 may run on quantum computing service 102. For example, user interface 132 may run on a local machine managed by a user, and the rest of quantum programming environment 114 may run on quantum computing service 102. In some embodiments, quantum programming environment 114 may run entirely on quantum computing service 102, and user 104 may not necessarily need to install an application, such as an SDK, for accessing quantum programming environment 114. For example, user 132 may be hosted on quantum computing service 102 and provided to user 104 as an interactive website. In some embodiments, quantum programming environment 114 may be implemented using one or more computing devices 800 (in FIG. 8).

In some embodiments, user interface 132 of quantum programming environment 114 may include an interactive graphic interface. Within user interface 132, user 104 may be able to compose high-level, mid-level, and/or low-level quantum programs. For example, in some embodiments, user interface 132 may provide an editor window where user 104 may edit, debug, build, and submit a high-level quantum program using a text-based quantum programming language (e.g., Quil, OpenQASM, cQASM, etc.). In some embodiments, user interface 132 may provide non-hardware specific gates and/or hardware specific gates, such as native quantum gates, to allow user 104 to compose a mid-level or low-level quantum program or quantum circuit by defining one or more quantum circuits using a quantum circuit diagram. In some embodiments, within user interface 132, user 104 may compose a quantum program or quantum circuit using text-based quantum programming language(s) and/or symbols, such as quantum gate(s). For example, one portion of the quantum program may be represented in a text-based quantum programming language, while another portion of the quantum program may be represented in a quantum circuit diagram. For example, text may indicate "for loops", "if loops", "while loops" etc. and quantum circuit diagrams may represent quantum circuits for which the various loop logic applies or depends.

In some embodiments, quantum programming environment 114 may include assisted composition system 130 to assist user 104 to compose quantum programs. As indicated in FIG. 1, in some embodiments, assisted composition system 130 may include library 134, abstract representation generator 136, and search/match engine 138. In some embodiments, library 134 may store one or more quantum programs and one or more abstract representations respectively of the quantum programs. As described above, library 134 may be implemented using various database technologies. For example, in some embodiments, one or more libraries 134 may be implemented as one or more relational databases storing one or more records, each of which may include a name (or ID) of a stored quantum program, a source code of the stored quantum program, and an abstract representation of the stored quantum program. In some embodiments, a library may store fewer entry types. For example, in some embodiments, a library may include an abstract representation and corresponding quantum algorithm text without other labels. As described above, the records in library 134 may correspond to general quantum programs or quantum circuits and/or user-defined quantum programs or quantum circuits that are received previously from users. Further, in some embodiments, only the records of completed quantum programs or quantum circuits that are ready to be submitted for translation, compilation, and execution may be stored in library 134.

Figure 2A:
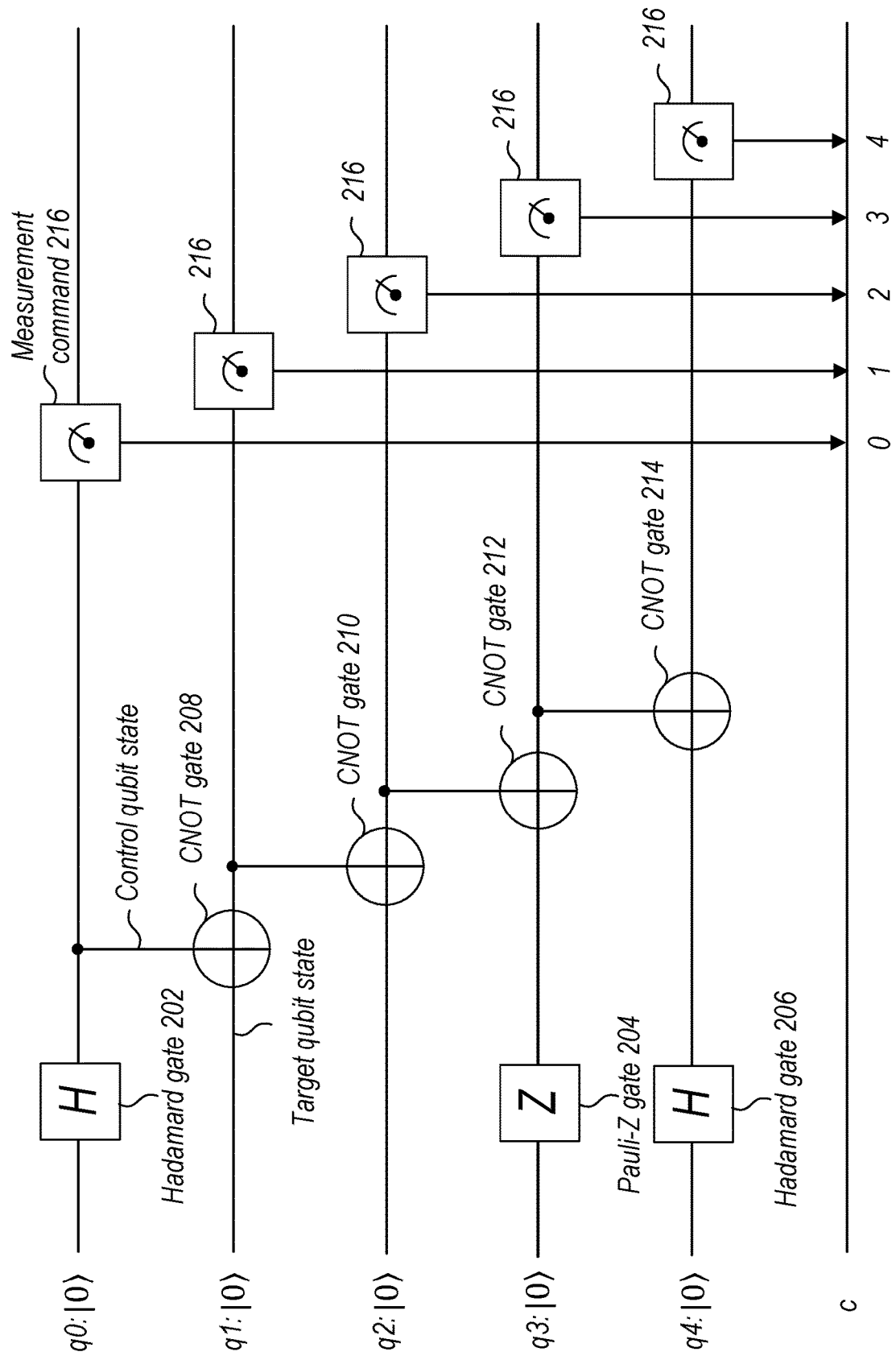
FIGS. 2A and 2B show an example quantum program or quantum circuit and an associated abstract syntax tree stored in a library, according to some embodiments.
Figure 2B:
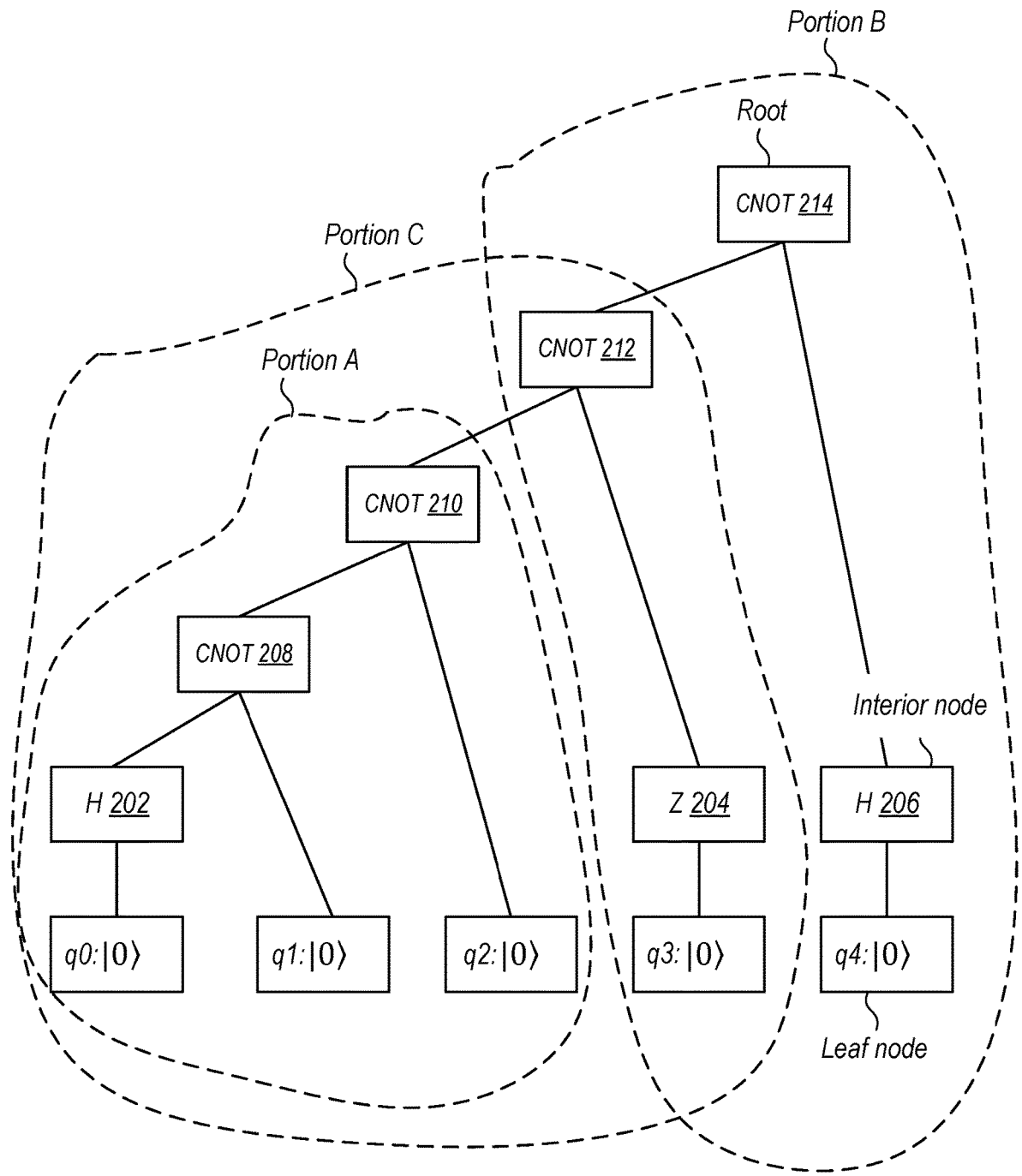

In some embodiments, the abstract representation of a quantum program or quantum circuit may be a tree representation, such as an abstract syntax tree of one or more quantum circuits included in the quantum program. In some embodiments, the abstract representation may also include an acyclic graph (e.g., a directed acyclic graph (DAG), a forest, or a polytree), or other types of abstract representations. FIGS. 2A and 2B show an example quantum circuit and an associated abstract syntax tree that may be stored in a library, according to some embodiments. As described above, qubits can have the characteristic of "superposition," meaning that a qubit can be measured as either 0 or 1. Thus, a qubit can be represented as a vector of two numbers with unit length (e.g., the length of the vector is equal to 1), where the two numbers define the probabilities between 0 and 1. In the context of quantum programming, a qubit can be denoted using Dirac notation, also known as Bra-ket notation. The bra represents row vectors and is denoted <|, and the key represents column vectors and is denoted |>. For example, <0|denotes the row vector (1 0), while <1|denotes the row vector (0 1). FIG. 2A illustrates a quantum program (in the form of a quantum circuit) involving five qubits, named q0, q1, q2, q3, and q4. Each row corresponds to a qubit, and ends with a measurement command. For example, the top row corresponds to the qubit q0, and the bottom row corresponds to the qubit q4. The notation q0: |0< means that q0 starts off in the state |0<. Further, each of the quantum gates 202-214 represents a quantum operation. In FIG. 2A, the quantum operations represented by quantum gates 202-214 are applied to the qubits sequentially from left to right. For example, a Hadamard gate performs a one-qubit rotation to map a qubit state ||0< or |1< to two superposition states 0 and 1 with equal probabilities. A Pauli-Z gate performs a rotation around the z-axis of the Bloch sphere by π radians. A CNOT gate receives a target qubit state and a control qubit state, and flips the target qubit state (e.g., from |0< to |1<, or vice versa) if and only if the control qubit state is |1<. Thus, in FIG. 2A, Hadamard gate 202 maps the state of qubit q0 to two superposition states 0 and 1 with equal probabilities. Pauli-z gate 206 rotates the qubit q4 around the z-axis by π radians. CNOT gate 208 flips the state of qubit q1 from |0< to |1< if and only if the output state of Hadamard gate 202 (e.g., the control qubit state) is |1<. The quantum program in FIG. 2A may be represented by the following example code:
Apply (i) H to q0, (ii) CNOT to q0 and q1, (iii) CNOT to q1 and q2, (iv) Z to q3, (v) CNOT to q2 and q3, (vi) H to q4, and (vii) CNOT to q3 and q4
   p=Program(H(0), CNOT(0, 1), CNOT(1,2), Z(3), CNOT(2,3), H(4), CNOT(3,4))
   #Get info for a 5-qubit quantum computer named QPU-3-5Q-A qc=get_qc(QPU-3-5Q-A')
   #Send program to the quantum computer and measure results
   c=qc.run_and_measure(p, trial=100)
   #Print results
   print(list(zip(c[4], c[3], c[2], c[1], c[0])))

In some embodiments, the structural or content-related details of the quantum program in FIG. 2A may be captured by an abstract representation such as an abstract syntax tree as illustrated in FIG. 2B. The abstract syntax tree is a tree representation of the syntactical elements of a source code. The tree includes one or more nodes organized into a hierarchy, where each node denotes a construct occurring in the source code. The tree has a root node, which is the top node. Nodes other than the root node have a unique parent, and nodes other than leaf nodes have one or more children. A node that has a child and that is not the root is also called an interior node. In FIG. 2B, there are five leaf nodes corresponding to the five qubits (or operands). Further, the interior nodes may correspond to the quantum gates (or operators). In this example, the root may also correspond to a quantum gate. The connection between the nodes may illustrate the quantum operations (represented by quantum gates 202-214) performed upon the qubits q0-q4. In FIG. 2A, the quantum operations are performed sequentially from left to right. Correspondingly, in FIG. 2B, the quantum operations are performed from the leaf nodes to the root. In other words, the abstract syntax tree in FIG. 2B may be considered equivalent to the quantum program in FIG. 2A, except that the two are represented in different forms. Given the nature of the abstract syntax tree, it may thus become possible for assisted composition system 130 to use the abstract syntax tree to identify and select stored quantum program(s) from library 134 to assist the composition of quantum programs.

Figure 3A:
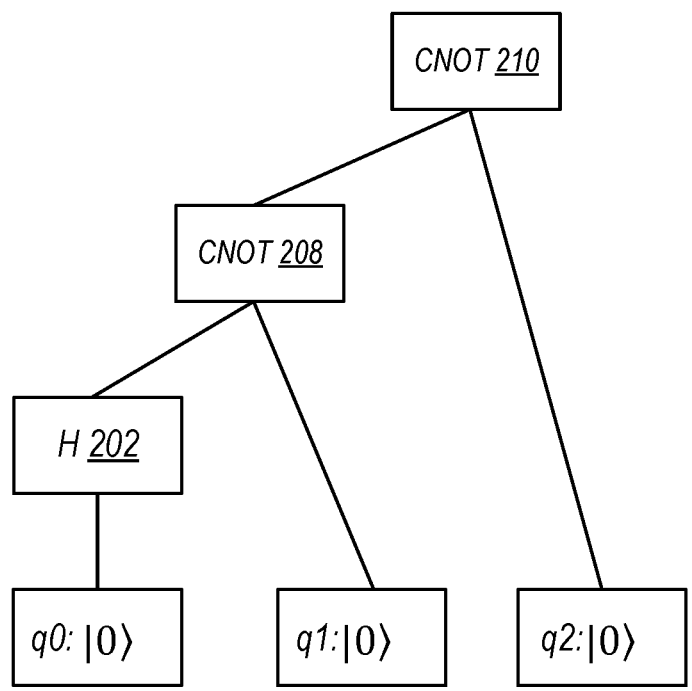
FIGS. 3A and 3B show example abstract syntax trees of uncompleted quantum programs or quantum circuits that are being composed by a user, according to some embodiments.
Figure 3B:
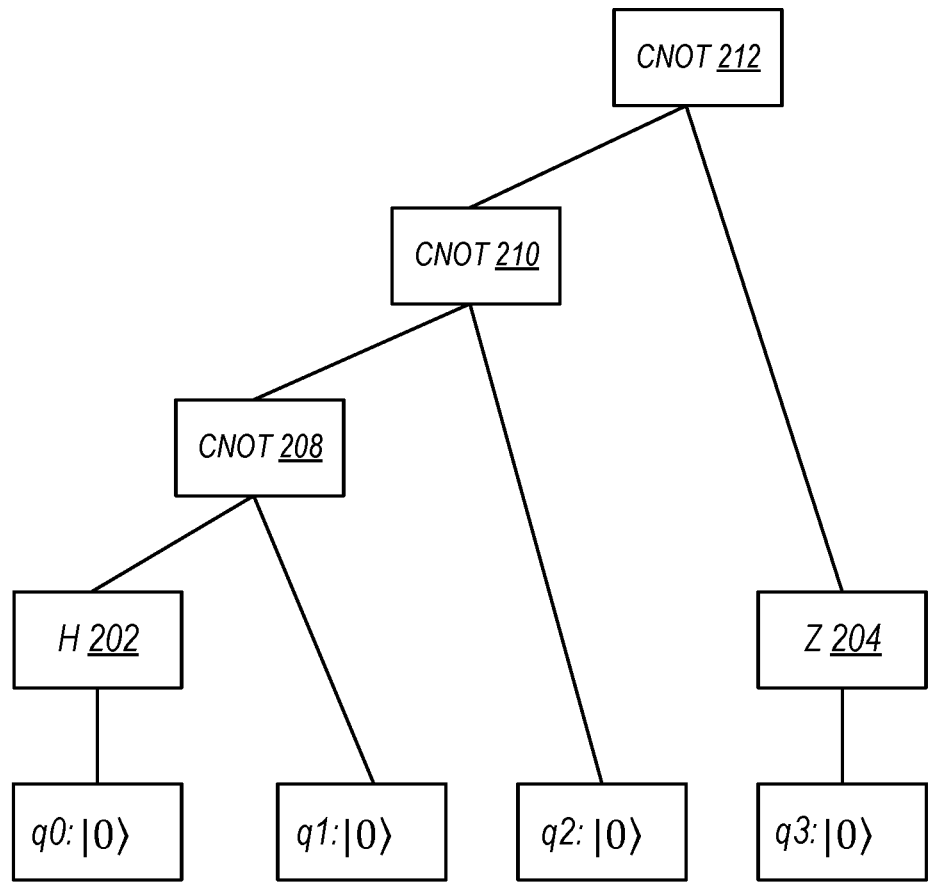

FIGS. 3A and 3B show example abstract syntax trees of uncompleted quantum programs composed by a user, according to some embodiments. In this example, consider that user 104 provides a partial portion of a quantum program (e.g., an uncompleted quantum program) as below in user interface 132:

p=Program(H(0), CNOT(0, 1), CNOT(1,2),

In some embodiments, abstract representation generator 136 may obtain the partial portion of the quantum circuit from user interface 132, and generate an abstract representation of the partial portion, such as an abstract syntax tree in FIG. 3A. Based on the generated abstract representation, search/match engine 138 may search library 134 to determine whether the generated abstract representation resembles at least a portion of the abstract representation of a stored quantum circuit or quantum program in the library. For example, assuming that library 134 stores the quantum circuit and abstract syntax tree that are described above in FIGS. 2A-2B, search/match engine 136 may identify that the abstract syntax tree of the partial portion (in FIG. 3A) matches or is same as the portion A of the stored abstract syntax tree in library 134 (in FIG. 2B). For example, the abstract syntax tree of the partial portion may have the same gates connected in the same manner as the portion A of the stored abstract syntax tree in library 134. In some embodiments, the gate structure may match but the data qubits may have the same or different values. In order words, search/match engine 136 may identify a match between an abstract syntax tree of an uncompleted quantum circuit or quantum program currently being composed by user 104 and a portion of an abstract syntax tree of a completed quantum circuit or quantum program stored in library 134. As a result, search/match engine 136 may provide a recommendation to user 104 indicating a yet to be entered portion of the matched record that has been found, where the portion is presented as a suggestion for completing a line, set of lines, or whole quantum circuit and/or quantum program being entered by the user. For example, search/match engine 136 may cause a window to pop up within user interface 132 to display the name (or ID) of the stored quantum program or quantum circuit in library 134. Further, in some embodiments, search/match engine 138 may further identify a portion of the stored quantum program (in FIG. 2B), and provide the identified portion as a next portion to be added to the partial portion of the quantum program composed by user 104. For example, search/match engine 138 may obtain a remaining portion of the source code of the quantum program that is stored in the library (e.g., " . . . Z(3), CNOT(2,3), H(4), CNOT(3,4))". This corresponds to the portion B of the abstract syntax tree in FIG. 2B from library 134. The assisted composition system 130 may further cause the portion to be added to be displayed in the pop-up window within user interface 132. When user 104 decides to use the recommended portion, user 104 may provide an indication to assisted composition system 130. In response, search/match engine 138 may obtain the portion to be added from library 134, and add it to the uncompleted quantum program as the next portion of the quantum circuit or quantum program. Note that depending on the complexity of the quantum program being composed by user 104, the recommended portion of the stored quantum program may include one or more lines of a quantum circuit or quantum program. In some embodiments, the added portion may be added in accordance with a format being used to compose the quantum circuit or quantum program. For example, if composing a quantum circuit using a quantum circuit diagram as shown in FIG. 2A, then a suggested portion to be added may be added as additional elements, such as gates in the quantum circuit diagram. However, in the same or other embodiments, if a quantum circuit is being composed using a text-based format, such as shown in the window shown in FIG. 4, then the suggested portion to be added may be added as text. As mentioned above, the suggest portion to be added may finish a line of the program, may include multiple lines or portions of a circuit diagram, or may be a full match, wherein a full quantum circuit or full quantum program is suggested to be added to complete a partial version of the full quantum circuit or full quantum program that has been entered so far by the user.

In some embodiments, assisted composition system 130 may operate interactively during the composition process of user 104. During the composition process, abstract representation generator 136 may monitor the continuous progress of the composition of the quantum program, and iteratively generate or update the abstract syntax tree of the partial portion of the quantum program. In the foregoing example, if user 104 continues the composition, the partial portion of the quantum program may change to the following:

p=Program(H(0), CNOT(0, 1), CNOT(1,2), Z(3), CNOT(2,3)

As a result, abstract representation generator 136 may generate or update the abstract syntax tree in FIG. 3A to another abstract syntax tree in FIG. 3B. Accordingly, search/match engine 138 may identify that the abstract syntax tree of the current partial portion (in FIG. 3B) resembles the portion C of the stored abstract syntax tree in library 134 (in FIG. 2B). As a result, search/match engine 138 may change or update the recommended portion to " . . . H(4), CNOT(3,4))" as the next portion of the uncompleted quantum program or quantum circuit. In some embodiments, assisted composition system 130 may perform the foregoing operations interactively at a relatively high frequency. For example, after it provides a recommendation, assisted composition system 130 may wait only for a short period of time as the composition of the quantum program or quantum circuit progresses to provide a next recommendation. As a result, assisted composition system 130 may appear to be able to provide recommendations to user 104 in almost real-time. Given that the assisted composition is based on the resemblance of pairs of abstract representations, the foregoing assisted composition operations may be applied to high-level, mid-level, and/or low-level quantum programs represented in text-based quantum programming languages and/or quantum circuit diagrams, since abstract representation generator 136 may generate abstract representations regardless of what form may be used to represent a quantum program (e.g., high-level, mid-level, low-level, etc.).

In some embodiments, assisted composition system 130 may use a threshold to determine whether to make a recommendation to a user, wherein the threshold limits the number of matching portions to be recommended and/or requires the quantum program or quantum circuit being entered by the user to be sufficiently defined to limit plausible suggestions to be less than the threshold limit. For example, when the partial portion of the quantum program does not have sufficient content to indicate the quantum program that user 104 attempts to compose, search/match engine 138 may find too many matched records in library 134, but a majority of them may not necessarily be a good match for the circuit the user intends to compose. Thus, to improve the accuracy and quality of the search, assisted composition system 130 may use the threshold to limit the maximum number of matched records allowed to be recommended to user 104. For example, when the threshold is two, search/match engine 138 may not provide any recommendation when it finds more than two matched records in library 134. Instead, search/match engine 138 may wait for user 104 to continue to compose the quantum program, until it reaches the point where search/match engine 138 may narrow down to two or less matched records in library 134, and then provide a recommendation to the user. In some embodiments, the threshold may be configured to a default value by quantum programming environment 114 or quantum computing service 104. In some embodiments, the threshold may be configurable by user 104. In some embodiments, matches may be evaluated in view of the threshold for a plurality of types of suggestions, such as finishing a line of code, suggesting a next line of code, suggesting a set of lines of code, and/or suggesting a full quantum circuit or quantum program. For example, multiple quantum programs may share common lines of code. Thus, there may be more than a threshold number of possible quantum circuits or quantum programs that may match what the user has composed so far, but within the matching quantum circuits and/or quantum programs several may share a common next line of code, such that for a suggestion of a next line (or finishing a current line) the matching options are equal to or less than the threshold. Thus, the assisted composition system 130 may refrain from suggesting the whole quantum program or quantum algorithm, but may nevertheless provide a suggestion for completing the current or next line of the quantum program or quantum algorithm.

In some embodiments, assisted composition system 130 may be able to detect programming errors in quantum programs or quantum circuits composed by users. For example, in the foregoing example, by comparing the abstract representation of the partial portion with the abstract representation in library 134, search/match engine 138 may identify that the partial portion of the quantum program includes an error.

In addition, in some embodiments, assisted composition system may be able to determine what quantum computer or quantum hardware may execute quantum programs composed by users, and accordingly provide an indication recommending the appropriate quantum hardware providers for executing the quantum programs. For example, when abstract representation generator 136 parses and analyzes the partial portion of the quantum program (for generating the abstract representation), abstract representation generator 136 may be able to identify native quantum gates specific to a particular type of quantum computer or quantum hardware. Accordingly, assisted composition system 130 may provide an indication recommending one or more quantum hardware providers that offer the particular type of quantum computer or quantum hardware.

In some embodiments, library 134 may be implemented to reside on a local premise of user 104. For example, library 134 may be hosted on the local machine of user 134. Alternatively, in some embodiments, library 134 may be hosted on quantum computing service 102. In that case, when the assisted composition system 130 runs on the local machine of user 134, assisted composition system 130 may access library 134 using an application programming interface (API). Further, as described above, in some embodiments, assisted composition system 130 may use user-defined quantum programs on a per-user basis. For example, the stored user-defined quantum programs composed by user A may only be used to assist the composition of quantum program by user A, not a different user. In some embodiments, the user-defined quantum programs may be used across different users to assist the composition of quantum programs. For example, assisted composition system 130 may use stored user-defined quantum programs composed by user A to assist the composition of quantum programs by user B. In some embodiments, user B may be required to obtain a permission or authorization (e.g., a fee-based permission or authorization) for accessing the stored user-defined quantum programs composed by user A.

In some embodiments, search/match engine 138 may be implemented using an exact matching algorithm that operates on abstract representations as described above, e.g., the Z algorithm, Bover-Moore algorithm, Knuth-Morris-Pratt algorithm, the Aho-Corasick algorithm, etc. In some embodiments, search/match engine 138 may be implemented using an intelligent machine learning model, such as a transformer model (e.g., a baseline code sequence completion transformer model, a neural code sequence completion transformer model, etc.) trained on a training set of quantum program and associated abstract representations. When search/match engine 137 is implemented using an intelligent machine learning model, assisted composition system 130 may use the intelligent machine learning model to classify or recognize the partial portion of the quantum program without necessarily being required to generate an abstract representation, such as an abstract syntax tree. In some embodiments, based on the classification or recognition, the assisted composition system 130 may bypass some of the previous described operations and directly identify a matched quantum program in library 134. Assisted composition system 130 may then obtain a portion of the identified quantum program and provide it as the recommended next portion. Alternatively, in some embodiments, assisted composition system 130 may use the intelligent machine learning model to directly predict a remaining portion of the quantum program. In some embodiments, when user 104 composes a quantum program using a text-based quantum programming language, assisted composition system 130 may use an intelligent machine learning model-based search/match engine 138 (e.g., using a long-short term memory (LSTM), a generative adversarial network (GAN), a reinforcement learning (RL) algorithm, a convolutional neural network (CNN), etc.) to implement the parse and analysis of the quantum program composed by user 104, and accordingly provide recommended code to assist the composition. For example, search/match engine 138 may read a sequence of characters (i.e., the partial portion of the quantum program in the text-based quantum programming language), and predict another sequence of characters (i.e., the recommended next portion of the quantum program).

Referring back to FIG. 1, in some embodiments, quantum computing service 102 may include translation module 112. As described above, when user 104 composes a quantum program or quantum circuit using a text-based quantum programming language or a quantum circuit diagram comprising quantum gates, translation module 112 may translate the quantum program or quantum circuit to a native gate-level program file specific to a given type of quantum computer of quantum hardware.

In some embodiments, quantum computing service 102 may include back-end API transport module 110. Quantum programs that have been translated by translation module 112 (to a native language) may be provided to back-end API transport module 110 in order for the translated quantum computing programs to be compiled into executable code and transported to a quantum computer at a respective quantum hardware provider location for execution. In some embodiments, back-end API transport module 110 may implement one or more queues to queue the translated quantum computing program for execution on a quantum computer of the quantum hardware provider. In some embodiments, a completed quantum program or quantum circuit may be transmitted via a back-end API transport module 110 and later compiled at a quantum hardware provider.

In some embodiments, results of executing the quantum computing program on the quantum computer at the quantum hardware provider location may be stored in a data storage system of the service provider network 100. In some embodiments, results storage/results notification module 116 may coordinate storing results and may notify a user, such as user 104, that the results are ready from the execution of the user's quantum program, such as a quantum computing program or quantum circuit. In some embodiments, results storage/results notification module 116 may cause storage space in a data storage service to be allocated to a user to store the user's results. Also, the results storage/results notification module 116 may specify access restrictions for viewing the user's results in accordance with user preferences.

In some embodiments, quantum compute simulator using classical hardware 118 of quantum computing service 102, may be used to simulate a quantum computing program or quantum circuit using classical hardware. For example, one or more virtual machines of a virtual computing service may be instantiated to process a quantum computing program or quantum circuit simulation job. In some embodiments, quantum compute simulator using classical hardware 118 may fully manage compute instances that perform the simulation. For example, in some embodiments, a user may submit a quantum computing program or quantum circuit to be simulated and quantum compute simulator using classical hardware 118 may determine resources needed to perform the simulation job, reserve the resources, configure the resources, etc. In some embodiments, quantum compute simulator using classical hardware 118 may include one or more "warm" simulators that are pre-configured simulators such that they are ready to perform a simulation job without a delay typically involved in reserving resources and configuring the resources to perform simulation.

In some embodiments, quantum computing service 102 includes quantum hardware provider recommendation/selection module 120. In some embodiments, quantum hardware recommendation/selection module 120 may make a recommendation to a quantum computing service user as to which type of quantum computer or which quantum hardware provider to use to execute a quantum program submitted by the user. Additionally, or alternatively, the quantum hardware provider recommendation/selection module 120 may receive a user selection of a quantum computer type and/or quantum hardware provider to use to execute the user's quantum program. As described above, in some embodiments, assisted composition system 130 may provide a recommendation of quantum hardware providers to user 104. When user 104 makes a selection according to the recommendation from assisted composition system 130, the quantum hardware provider recommendation/selection module 120 may accordingly send the quantum program to the selected quantum hardware provider for execution.

FIG. 4 shows an example user interface of the quantum programming environment, according to some embodiments. In this example, user interface 132 may provide an interactive graphic interface. As indicated in FIG. 4, user interface 132 may provide one or more toolbars 402, through which user 104 may perform various programming functions, such as to edit, debug, build, and submit quantum programs. Further, user 132 may also provide an editor window to allow user 104 to compose a quantum program using a text-based quantum programming language. As indicated in FIG. 4, user 104 currently attempts to compose a quantum program, but has not completed it and thus provides only a partial portion of the quantum program. As described above, in some embodiments, user interface 132 may operate with assisted composition system 130 of quantum programming environment 114 to provide recommendations to assist the composition of a quantum circuit or quantum program. In this example, assisted composition system 130 may provide a recommendation in pop-up window 406 based on the partial portion of the quantum program, the quantum program corresponds to a stored quantum program (e.g., ID #340) in library 134. Further, within pop-up window 406, assisted composition system 130 may provide a portion of the stored quantum program (e.g., "Z(3), CNOT(2,3), H(4), CNOT(3,4))") as a next portion to be added to the uncompleted quantum program. If user 104 decides to take the recommendation and use the recommended portion to assist the composition, assisted composition system 130 may add the recommended portion to the quantum program in user interface 132. In some embodiments, assisted composition system 130 may also provide a recommendation of one or more quantum hardware providers (e.g., a particular or more of quantum hardware providers 122, 124, 126, 128, etc. in FIG. 1) for executing the quantum program. In addition, in some embodiments, if the partial portion of the quantum program has errors, assisted composition system 130 may further provide an indication that the partial portion of the quantum program includes an error. In some embodiments, the assisted composition system 130 may further suggest corrections to correct the identified errors.

FIG. 5 shows another example user interface of the quantum programming environment, according to some embodiments. In this example, user interface 132 may provide an interactive graphic interface for user 104 to compose a quantum program by drawing a quantum circuit diagram. For example, in some embodiments, user interface 132 may provide a user with multiple problem domains to select from when a problem-domain design paradigm is selected. For example, a less experienced user may select a problem-domain based paradigm. For example, the user may select problem domain quantum task button 506 to display a problem-domain based interface for designing a quantum circuit. The problem-domain based interface may include pre-configured quantum algorithms designed for performing particular functions associated with one or more respective problem domains. A user of the quantum computing service may select an applicable problem-domain for a problem to be solved by the user. Also, within a given problem-domain, the user may select one or more pre-configured quantum algorithms from the pre-configured quantum algorithms for the selected problem-domain in order to define a quantum algorithm be performed by the quantum computing service as the quantum computing object, such as a quantum circuit.

As another example, an intermediate level user may select a facilitated quantum algorithm design paradigm. The facilitated quantum algorithm design paradigm may be configured such that the quantum programming environment 114 facilitates design of a quantum circuit using user configurable building blocks without the user being required to understand all the nuances of designing a quantum circuit. For example, a user may select facilitated quantum algorithm design button 508 to display a quantum algorithm based interface for designing a quantum circuit. The quantum algorithm based interface may include pre-configured quantum logic elements configured to be arranged with one another to form a quantum algorithm, wherein a user of the quantum computing service selects and/or arranges the pre-configured quantum logic elements to define a particular quantum algorithm to be performed by the quantum computing service as the quantum computing object.

Additionally, as another example, a more experienced user may select a detailed quantum circuit based design paradigm. For example, a quantum circuit design based paradigm may give the user greater control to customize parameters of a quantum circuit, but may also require the user to have greater knowledge about quantum computers in order to be able to successfully design a quantum circuit using the quantum circuit based design paradigm. For example, a user may select detailed quantum circuit design button 510 to display a quantum circuit based interface for designing a quantum circuit. The quantum circuit based interface may include quantum operators and connectors, wherein a user of the quantum computing service combines the quantum operators and connectors to define a particular quantum circuit.

For example, FIG. 5 illustrates an example view of user interface 132 when the problem domain quantum task design option 506 is selected. In some embodiments, the quantum task/algorithm/circuit design space 504 may display a quantum circuit currently being defined via a given selected design paradigm. The user interface 132 presents a quantum task design space 504 along with a plurality of problem domains for a user to select from. For example, user interface 132 provides problem domain options for: a chemistry domain 516, a physics domain 518, a pharmaceutical domain 520, a biotechnology domain 522, a medical modelling domain 524, an information security domain 526, a machine learning domain 528, a process simulation domain 530, a physical modelling domain 532, an optimization problem domain 534 and/or other problem domains 536. Note that the problem domains shown in FIG. 5 are provided as example problem domains that may be supported by quantum programming environment 114 and should not be interpreted as an exhaustive list of all problem domains that may be supported.

User interface 132 may be configured to provide a user with domain specific design tools 514 based on which of the problem domains is selected. For example, if the chemistry domain 516 is selected, domain specific tools 514 may include pre-configured quantum algorithms typically used to solve chemistry related problems. In a similar manner, if the physics domain 518 is selected, domain specific tools 514 may include pre-configured quantum algorithms typically used to solve physics related problems. If other ones of the problem domains are selected, the domain specific tools 514 may be adjusted accordingly to include pre-configured quantum algorithms useful for solving problems in a given selected problem domain.

In some embodiments, selecting a particular one of the tools of the domain specific tools 514 may cause a pre-configured quantum algorithm element to be added to the quantum object (e.g. quantum task/algorithm/circuit) being designed in quantum task design space 504. The user may then modify the pre-configured quantum algorithm element, arrange it with other pre-configured quantum algorithm elements to define the quantum object, or provide input parameters or other parameters to the pre-configured quantum algorithm element or the overall quantum object being defined.

In some embodiments, a user may save a quantum object designed in quantum task design space 504 for later use. Also, in some embodiments, a user may contribute a quantum object designed in quantum design space 504 to a sharing application, such as a marketplace that enables other users of the quantum computing service to use the quantum object. For example, a chemistry user may define a quantum object for determining an energy state for a particular molecule and may select pre-configured solution marketplace button 512 to submit the quantum object for determining the energy state for the particular molecule to a shared marketplace. This may allow other users of the quantum computing service to use the already defined quantum object to solve similar problems. Also, in some embodiments, the user may be compensated when another user uses the user's pre-defined quantum object. In other embodiments a pre-configured solution marketplace may be open source, such that the user grants access to the user's pre-defined quantum object with the expectation of being able to access other quantum objects defined by other users to solve other problems, such as determining energy states of other molecules.

In some embodiments, a user may select a pre-defined quantum object from a pre-configured solution marketplace and may further modify or combine the pre-defined quantum object with other elements to form a new quantum object. This may be done in quantum task design space 504. The user may then cause the modified quantum object to be executed on a quantum computer and/or provide the modified quantum object back to the pre-configured solution marketplace.

As described above, in some embodiments, user interface 132 may operate with assisted composition system 130 of quantum programming environment 114 to assist the composition of quantum programs. In this example, the quantum program composed by user 104 may be represented in a quantum circuit diagram displayed in quantum task design space 504. Assisted composition system 130 may be able to analyze the partial portion of the quantum circuit diagram provided by user 104 to identify matched quantum program (s) stored in library 134 to assist the composition of the quantum circuit. For example, abstract representation generator 136 may obtain the partial portion of the quantum circuit diagram, and generate an abstract syntax tree for the partial portion of the quantum circuit diagram. Based on the abstract syntax tree, search/march engine 138 may search library 134 and determine whether it resembles at least a portion of the abstract syntax tree of a stored quantum program in library 134. If so, search/match engine 138 may obtain a remaining portion of the stored quantum program from library 134, and provide it as a recommended next portion of the uncompleted quantum circuit diagram. For example, if the partial portion of the quantum problem composed by user 104 corresponds to the abstract syntax tree in FIG. 3B, assisted composition system 130 may be able to determine that this abstract syntax tree resembles the portion A of the abstract syntax tree in FIG. 2B, and thus provide a portion of the stored quantum circuit corresponding to the portion B of the abstract syntax tree in FIG. 2B to user 104. If user 104 decides to use the recommended portion as the next portion, assisted composition system 130 may add the provided portion to the quantum circuit diagram in quantum task design space 504. Further, as described above, in some embodiments, assisted composition system 130 may provide an indication when the partial portion of the quantum program includes an error, or provide a recommendation of one or more quantum hardware providers for executing the quantum program.

Figure 6:
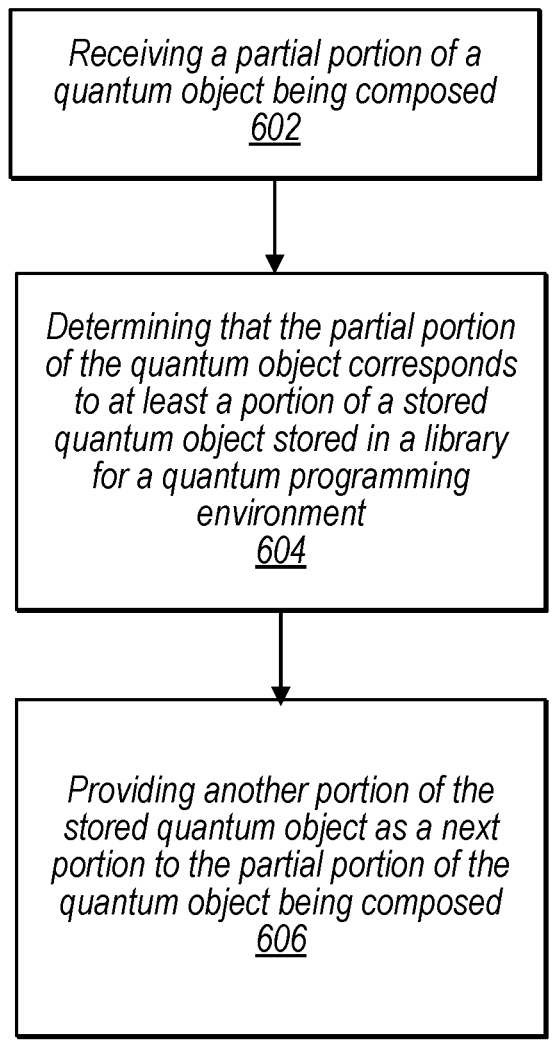
FIG. 6 shows a simplified flowchart illustrating an example method for assisting the composition of a quantum program or quantum circuit, according to some embodiments.

FIG. 6 shows a simplified flowchart illustrating an example method for assisting the composition of a quantum program or quantum circuit, according to some embodiments. In FIG. 6, in some embodiments, a partial portion of a composed quantum object (e.g., a quantum program and/or quantum circuit) that is being composed but not yet completed by a user may be received by a quantum programming environment (e.g., quantum programming environment 114) (block 602). As described above, in some embodiments, the partial portion of the composed quantum object may be received at a user interface (e.g., user interface 132) of the quantum programming environment. In some embodiments, the composed quantum object may be represented in a text-based quantum programming language and/or a quantum circuit diagram. In some embodiments, the quantum programming environment may be operatively coupled with a network-accessible quantum computing service (e.g., quantum computing service 102) of a service provider network (e.g., service provider network 100). In some embodiments, the quantum computing service may provide users of the quantum programming environment further access to one or more quantum hardware providers (e.g., quantum hardware providers 122-128) where quantum algorithms composed by the user may be executed.

In some embodiments, the quantum programming environment may determine that the partial portion of the composed quantum object corresponds to at least a portion of a stored quantum object, such as a stored quantum program or quantum circuit, stored in a library for the quantum programming environment (block 604). As described above, in some embodiment, the quantum programming environment may include an assisted composition system (e.g., assisted composition system 130) to assist the composition of quantum objects. In some embodiments, the assisted composition system may include a library (e.g., library 134) that stores one or more quantum objects (e.g., the source codes and/or source circuit diagrams of general and/or user-defined quantum programs or quantum circuits) and their associated abstract representations (e.g., abstract syntax trees). In some embodiments, the assisted composition system may use an abstract representation generator (e.g., abstract representation generator 136) to generate an abstract representation of the partial portion of the composed quantum object to capture the structural or content-related details of the composed quantum object. Further, in some embodiments, the assisted composition system may include a search/match engine (e.g., search/match engine 138) that may search the library to determine whether the abstract representation of the partial portion of the composed quantum object resembles at least a portion of the abstract representations of a stored quantum object in the library for the quantum programming environment. If so, the search/match engine may provide an indication that the partial portion of the composed quantum objects corresponds to at least a portion of the stored quantum object. For example, if the abstract syntax tree of the partial portion of the composed quantum object is the abstract syntax tree shown in FIG. 3A, the assisted composition system may determine that this abstract syntax tree matches at least the portion A of the abstract syntax tree of the stored quantum object shown in FIG. 2B. As a result, the assisted composition system may determine that the composed quantum object corresponds to at least a portion of a stored quantum object as illustrated in FIG. 2A. As described above, in some embodiment, the library for the quantum programming environment may reside at a local machine of the user. In some embodiments, the library for the quantum programming environment may reside at a remote location, such as hosted at the quantum computing service (e.g., quantum computing service 102), and the quantum programming environment may access the library through network connections (e.g., using an API call).

In some embodiments, when it is determined that the partial portion of the composed quantum object corresponds to at least a portion of a stored quantum object, the quantum programming environment may provide another portion of the stored quantum object as a recommended next portion to the partial portion of the composed quantum object (block 606). In the foregoing example, the assisted composition system may obtain the other portion of the stored quantum object corresponding to the portion B of the abstract syntax tree of the stored quantum object as shown in FIG. 2B, and provide it to user 104 as the recommended next portion of the composed quantum object.

Figure 7:
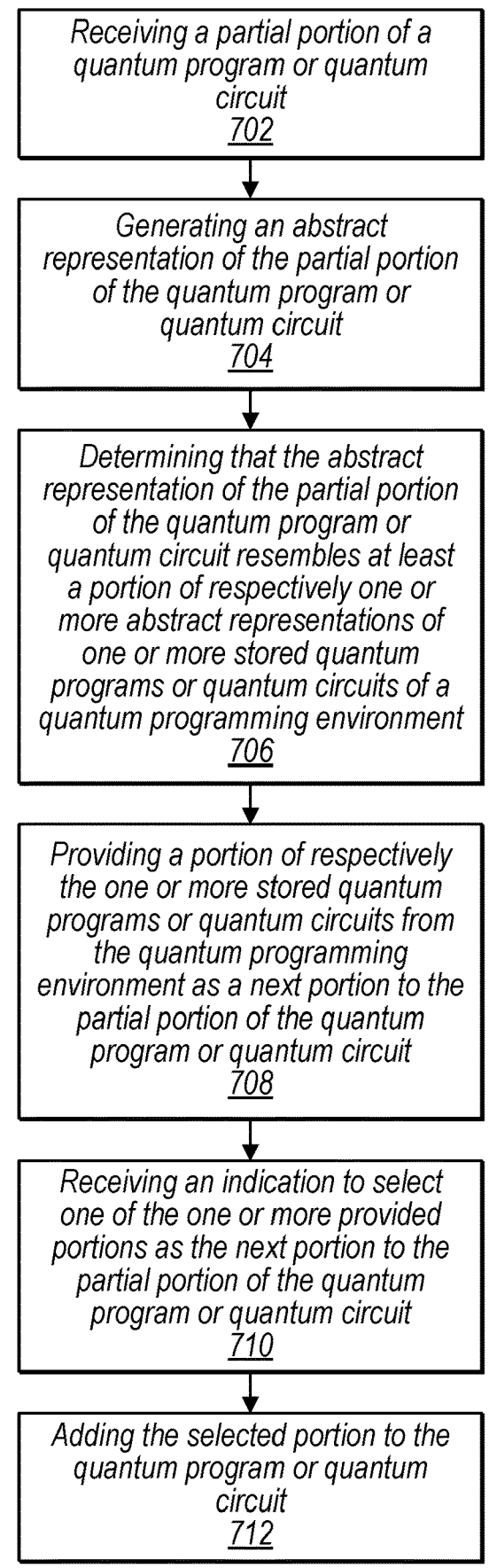
FIG. 7 shows another simplified flowchart illustrating an example method for assisting the composition of a quantum program or quantum circuit, according to some embodiments.

FIG. 7 shows another simplified flowchart illustrating an example method for assisting the composition of a quantum program or quantum circuit, according to some embodiments. In FIG. 7, in some embodiments, a partial portion of a quantum program or quantum circuit composed by a user may be received by a quantum programming environment (e.g., quantum programming environment 114) (block 702). As described above, in some embodiments, the partial portion of the quantum program or quantum circuit may be received at a user interface (e.g., user interface 132) of the quantum programming environment. In some embodiments, the quantum program may be represented in a text-based quantum programming language and/or a quantum circuit diagram. In some embodiments, the quantum programming environment may be operatively coupled with a network-accessible quantum computing service (e.g., quantum computing service 102) of a service provider network (e.g., service provider network 100). In some embodiments, the quantum computing service may provide users of the quantum programming environment further access to one or more quantum hardware providers (e.g., quantum hardware providers 122-128) where quantum programs or quantum circuits composed by the user may be executed.

In some embodiments, the quantum programming environment may generate an abstract representation of the partial portion of the quantum program or quantum circuit (block 704). As described above, in some embodiments, the abstract representation may be a tree representation, such as an abstract syntax tree. In some embodiment, the quantum programming environment may include an assisted composition system (e.g., assisted composition system 130), which may further include an abstract representation generator (e.g., abstract representation generator 136). The abstract representation generator may monitor the progress of the composition of the quantum program or quantum circuit, obtain the partial portion of the quantum program or quantum circuit when it is received by the quantum programming environment, and then generate the abstract representation (e.g., an abstract syntax tree) of the partial portion of the quantum program or quantum circuit.

In some embodiments, based on the generated abstract representation of the partial portion of the quantum program or quantum circuit, the quantum programming environment may determine that this abstract representation resembles at least a portion of respectively one or more stored abstract representations of one or more quantum programs or quantum circuits of the quantum programming environment (block 706). As described above, in some embodiments, the assisted composition system may use a library (e.g., library 134) for the quantum programming environment to store one or more quantum programs or quantum circuits (e.g., general and/or user-defined quantum programs or quantum circuits) and their associated abstract representations (e.g., abstract syntax trees). Further, in some embodiments, the stored quantum programs or quantum circuits may be completed quantum programs or quantum circuits that are ready to be submitted for translation, compilation, and execution. In some embodiments, the assisted composition system may include a search/match engine (e.g., search/match engine 138) that may search the library to determine whether the abstract representation of the partial portion of the quantum program or quantum circuit resembles at least a portion of a quantum program or quantum circuit stored in the library. In some embodiments, the search/match engine may operate according to a threshold. In some embodiments, the threshold may indicate an allowable maximum number of matched records that may be recommended to the user. Thus, when the search/match engine finds a number of matched records in the library that is more than the threshold, the assisted composition system may wait for the user to continuously compose the quantum program or quantum circuit, until it reaches the point where the search/match engine may find another number of matched records in the library less than the threshold, and then made the determination that the abstract representation of the partial portion resembles at least a portion of at least one stored quantum program or quantum circuit of the quantum programming environment. As described above, in some embodiments, the search/match engine may be implemented using exact matching algorithm(s), or intelligent machine learning model(s). Further, in some embodiments, the assisted composition system may use a machine learning model-based search/match engine to read a sequence of characters (i.e., the partial portion of the quantum program or quantum circuit in the text-based quantum programming language), and predict another sequence of characters (i.e., the recommended next portion of the text-based quantum program).

In some embodiments, when it is determined that the abstract representation of the partial portion of the quantum program or quantum circuit resembles at least a portion of respectively one or more abstract representations of one or more stored quantum programs or quantum circuits, the quantum programming environment may provide a portion of respectively the one or more stored quantum programs or quantum circuits to the user as a next portion to the partial portion of the quantum program or quantum circuit (block 708). As described above, when the threshold is two, the quantum programming environment may provide the code of two or less stored quantum programs from the library to the user to assist the composition of the quantum program.

In some embodiments, the quantum programming environment may receive an indication from the user to select one of the one or more provided portions as the next portion of the quantum program or quantum circuit (block 710). In response, the quantum programming environment may add the selected portion to the quantum program or quantum circuit (block 712).

Figure 8:
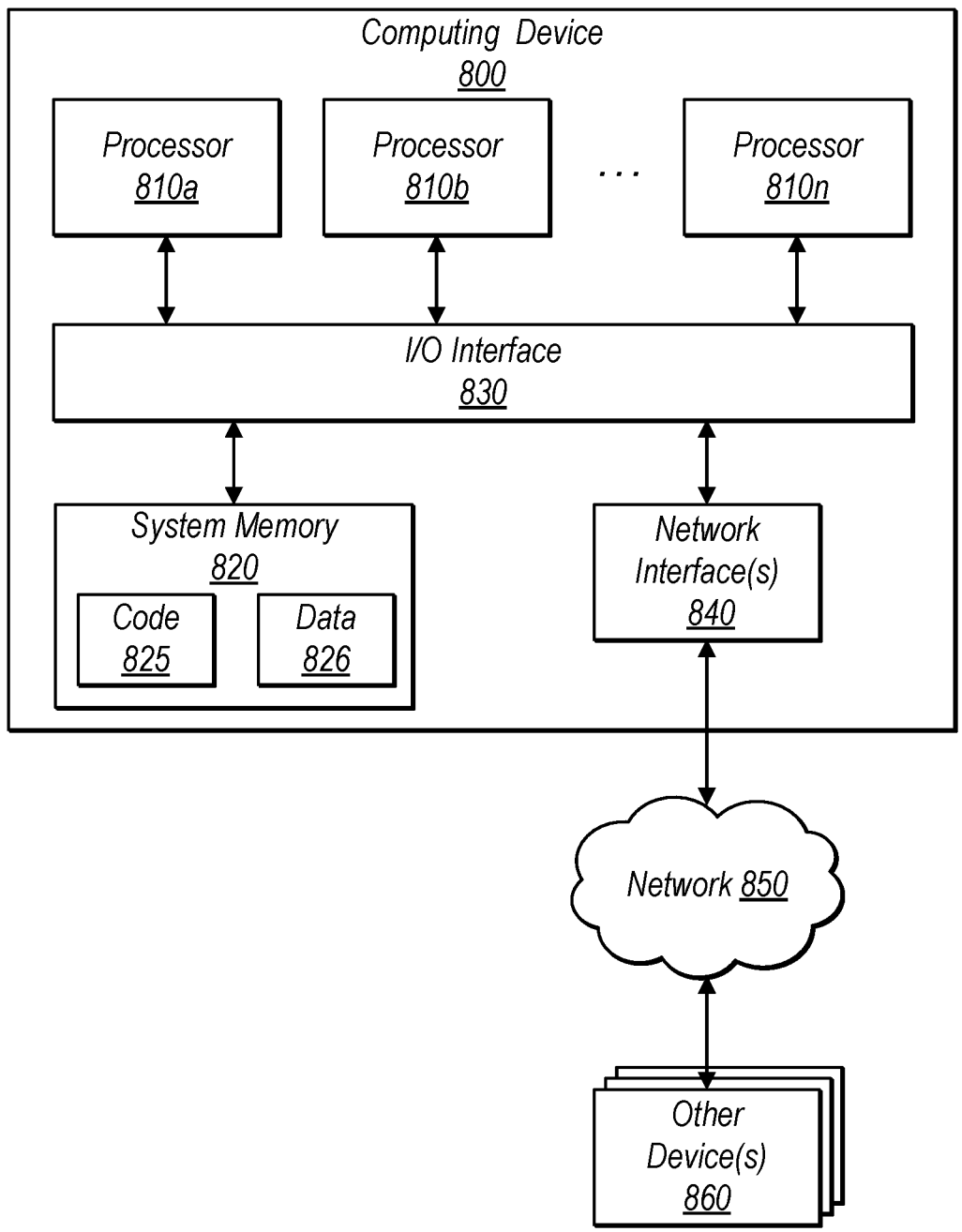
FIG. 8 is a block diagram illustrating an example classical computing device that may be used in at least some embodiments.

FIG. 8 shows an example computing system to implement the various techniques described herein, according to some embodiments. For example, in one embodiment, a quantum program environment (e.g., quantum programming environment 114) including an assisted composition system (e.g., assisted composition system 130) may be implemented by a computer system, for instance, a computer system as in FIG. 8 that includes one or more processors executing program instructions stored on a computer-readable storage medium coupled to the processors. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In various embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, such as the quantum programming environment including the assisted composition system described above in FIGS. 1-7, are shown stored within system memory 830 as code 826 and data 827.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIG. 1-xx. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
a quantum programming environment implemented using one or more computing devices to allow users to compose quantum objects, wherein a quantum object comprises a quantum program or a quantum circuit, and wherein the quantum programing environment is configured to:
receive an input composed by a user;
generate a first abstract syntax tree based on the input;
determine that the first abstract syntax tree, or a portion thereof, matches at least a first portion of a second abstract syntax tree of a stored quantum object stored in a library for the quantum programming environment; and
provide the stored quantum object to the user, as a portion of a quantum object being composed.

2. The system of claim 1, wherein the library for the quantum programming environment is hosted on a quantum computing service.

3. The system of claim 1, wherein the library for the quantum programming environment comprises user-defined quantum programs.

4. The system of claim 1, wherein the quantum programming environment is further configured to provide a recommendation of one or more quantum hardware providers for executing the provided stored quantum object.

5. The system of claim 1, wherein the quantum programming environment is configured to provide the user access to a quantum computing service of a provider network, and wherein the quantum computing service is configured to provide the user access to one or more quantum hardware providers.

6. The system of claim 1, wherein providing the at least a portion of the stored quantum object is determined according to a threshold number of stored quantum object portions to be provided to the user.

7. A method, comprising:
receiving, at an interface of a quantum programming environment implemented using one or more computing devices, an input;
generating a representation of at least a portion of a quantum object based on the input;
determining, by the quantum programming environment, that the representation of the at least a portion of the quantum object, or a portion thereof, matches at least a first portion of a stored quantum object stored in a library for the quantum programming environment; and
providing, by the quantum programming environment, at least a portion of the stored quantum object to a user as a portion of a quantum object being composed.

8. The method of claim 7, wherein the library for the quantum programming environment is hosted on a quantum computing service.

9. The method of claim 7, further comprising:
receiving an indication to select at least a portion of the stored quantum object; and
adding the at least a portion of the stored quantum object to the quantum object being composed in the quantum programming environment.

10. The method of claim 9, further comprising:
providing a recommendation of one or more quantum hardware providers for executing the quantum object being composed.

11. The method of claim 9, wherein the quantum object being composed is represented in a text-based quantum programming language or a quantum circuit diagram.

12. The method of claim 7, wherein generating the representation of the quantum object comprises determining a first abstract syntax tree for the quantum object, wherein determining that the representation of the quantum object, or the portion thereof, matches the at least first portion of the stored quantum object comprises:
determining that the first abstract syntax tree of the quantum object, or the portion thereof, matches a first portion of a second abstract syntax tree of the stored quantum object, and
wherein providing the second portion of the stored quantum object comprises:
identifying the second portion of the stored quantum object based on the match of the first abstract syntax tree, or the portion thereof, with the first portion of the second abstract tree.

13. The method of claim 12, wherein determining that the partial portion of the quantum object, or the portion thereof, matches at least the first portion of the stored quantum object is performed using an exact matching algorithm or a machine learning model.

14. The method of claim 7, wherein determining that the partial portion of the quantum object being composed, or the portion thereof, matches at least the first portion of the stored quantum object comprises:

providing the at least a portion of the stored quantum object according to a threshold number of stored quantum objects to be provided.

15. One or more non-transitory computer readable media comprising instructions that, when executed on or across one or more processors, cause the one or more processors to:

receive, at a user interface of a quantum programming environment, an input;

generate, based on the input, a representation of at least a portion of a quantum object;

determine that the representation of the at least a portion of the quantum object, or a portion thereof, matches to at least a first portion of a stored quantum object stored in a library for the quantum programming environment; and provide, to a user, a second portion of the stored quantum object as a next portion of a quantum object being composed by the user.

16. The one or more non-transitory computer readable media of claim 15, wherein the library for the quantum programming environment comprises user-defined quantum programs.

17. The one or more non-transitory computer readable media of claim 16, wherein the quantum programming environment allows a user to determine whether a user-defined quantum program created by the user is authorized to be provided for use in a quantum object being composed by another user.

18. The one or more non-transitory computer readable media of claim 15, further comprising instructions that when executed on or across the one or more processors, cause the one or more processors to:

receive an indication to select the second portion of the stored quantum object for use in the quantum object being composed; and add the selected second portion of the stored quantum object to the quantum object being composed.

19. The one or more non-transitory computer readable media of claim 18, further comprising instructions that when executed on or across the one or more processors, cause the one or more processors to:

provide a recommendation of one or more quantum hardware providers for executing the quantum object being composed.

20. The one or more non-transitory computer readable media of claim 15, wherein the program instructions, when executed on or across the one or more processors, at least partially implement the quantum programming environment, and wherein the quantum programming environment provides users access to one or more quantum hardware providers.

* * * * *